(12) United States Patent
Braun

(10) Patent No.: US 10,517,311 B2
(45) Date of Patent: Dec. 31, 2019

(54) TASTE AND FLAVOR MODULATION BY BIOTRANSFORMATION IN MILK PRODUCTS

(75) Inventor: Marcel Braun, Konolfingen (CH)

(73) Assignee: Societe des Produits Nestle S.A., Vevey (CH)

( * ) Notice: Subject to any disclaimer, the term of this patent is extended or adjusted under 35 U.S.C. 154(b) by 416 days.

(21) Appl. No.: 12/446,571

(22) PCT Filed: Oct. 23, 2007

(86) PCT No.: PCT/EP2007/009185
§ 371 (c)(1),
(2), (4) Date: Apr. 21, 2009

(87) PCT Pub. No.: WO2008/049581
PCT Pub. Date: May 2, 2008

(65) Prior Publication Data
US 2011/0014322 A1    Jan. 20, 2011

(30) Foreign Application Priority Data

Oct. 23, 2006 (EP) .................................. 06022153

(51) Int. Cl.
| | |
|---|---|
| *A23C 9/12* | (2006.01) |
| *A23C 9/13* | (2006.01) |
| *A23G 9/40* | (2006.01) |
| *A01N 37/44* | (2006.01) |
| *A23C 9/123* | (2006.01) |
| *A23L 27/24* | (2016.01) |
| *A23P 10/40* | (2016.01) |

(52) U.S. Cl.
CPC .................................. *A23C 9/1322* (2013.01)

(58) Field of Classification Search
CPC ... A23C 9/1203; A23C 9/1206; A23C 9/1209; A23C 9/1216; A23L 1/2305
USPC .......................................................... 426/35
See application file for complete search history.

(56) References Cited

U.S. PATENT DOCUMENTS

| | | | | |
|---|---|---|---|---|
| 3,852,496 | A | * | 12/1974 | Weetall et al. ................. 426/41 |
| 3,858,492 | A | | 1/1975 | Mukai et al. .................... 426/36 |
| 3,975,544 | A | | 8/1976 | Kosikowski ..................... 426/35 |
| 4,007,283 | A | * | 2/1977 | Crisan et al. ................... 426/34 |
| 4,675,193 | A | | 6/1987 | Bourdreaux ..................... 426/35 |
| 5,145,697 | A | * | 9/1992 | Cajigas ........................... 426/43 |

(Continued)

FOREIGN PATENT DOCUMENTS

| | | |
|---|---|---|
| CA | 1 220 075 | 4/1987 |
| CA | 1506108 | 6/2004 |

(Continued)

OTHER PUBLICATIONS

Kraneneburg, et al., Flavor Formation From Amino Acids by Lactic Acid Bacteria: Predictions from Genome Sequence Analysis, vol. 12, Issue 2-3, 2002, p. 111-121.*

(Continued)

*Primary Examiner* — D. Lawrence Tarazano
*Assistant Examiner* — Philip A Dubois
(74) *Attorney, Agent, or Firm* — K&L Gates LLP

(57) ABSTRACT

The present invention relates to a method for promoting natural tastes and flavors in milk-based products, to a method for manufacturing such milk products and to the products thus made or obtainable by the method.

22 Claims, 3 Drawing Sheets

(56) References Cited

U.S. PATENT DOCUMENTS

| | | | |
|---|---|---|---|
| 5,385,743 A | | 1/1995 | Hans Van Der Schaft .... 426/42 |
| 6,010,725 A | * | 1/2000 | Meister et al. ................. 426/61 |
| 6,287,260 B1 | * | 9/2001 | Hascoet et al. ............... 600/454 |
| 6,635,303 B1 | | 10/2003 | Youcheff et al. ............. 426/588 |

FOREIGN PATENT DOCUMENTS

| | | | | |
|---|---|---|---|---|
| CN | 1 506 108 A | | 6/2004 | |
| DE | 148 419 | | 3/1901 | |
| DE | 2 362 998 | | 6/1974 | |
| EP | 137 536 | | 4/1985 | |
| EP | 0 462 210 A2 | * | 8/1991 | ............... A23L 1/23 |
| EP | 1 053 689 A2 | | 11/2000 | |
| EP | 1 186 244 A2 | | 3/2002 | |
| GB | 823556 | | 11/1959 | |
| GB | 1 070 400 | | 6/1967 | |
| JP | 58-43755 | | 3/1983 | |
| JP | 64-2549 | | 1/1989 | |
| JP | 3-127962 | | 5/1991 | |
| JP | 3-175978 | | 7/1991 | |
| JP | 2 756 183 B2 | | 6/1992 | |
| JP | 5-49385 | | 3/1993 | |
| JP | 5-91851 | | 4/1993 | |
| JP | 6 125 733 A | | 5/1994 | |
| JP | 6-319448 | | 11/1994 | |
| JP | 9-37735 | | 2/1997 | |
| JP | 2002-34449 | | 2/2002 | |
| JP | 2002-142713 | | 5/2002 | |
| JP | 2002-306062 | | 10/2002 | |
| JP | 2003-250482 | | 9/2003 | |
| JP | 2004-236638 | | 8/2004 | |
| JP | 2004-267126 A | | 9/2004 | |
| JP | 2005-151895 | | 6/2005 | |
| WO | WO9202143 | * | 2/1992 | ............. A23C 11/04 |
| WO | WO 01/32905 A1 | | 5/2001 | |
| WO | WO 01/47366 A1 | | 7/2001 | |
| WO | WO 02/00845 A1 | | 1/2002 | |
| WO | WO 02/085131 A1 | | 10/2002 | |
| WO | WO 2005/041675 A1 | | 5/2005 | |
| WO | WO 2006/079420 A1 | | 8/2006 | |

OTHER PUBLICATIONS

Wenderoff et al, Use of Yeast Beta-Galactosidase in Milk and Milk Products, J Milk Food Technol., vol. 34, No. 6 (1971).*

Ayad et al, Flavour forming abilities and amino acid requirements of Lactococcus lactis strains isolated from artisanal and non-dairy origin, International Dairy Journal 9 (1999) 725-735.*

Singh et al, Flavor of Cheddar Cheese: A Chemical and Sensory, vol. 2, 2003—Comprehensive Reviews in Food Science and Food Safety, p. 166-189.*

Fu et al, Heterologous Leaky Production of Transglutaminase in Lactococcus lactis Significantly Enhances the Growth Performance of the Host, Applied and Environmental Microbiology, Dec. 2005, p. 8911-8919, vol. 71, No. 12.*

Kilpi, E. E.-R., et al., "Angiotensin I-Converting Enzyme Inhibitory Activity in Milk Fermented by Wild-Type and Peptidase-Deletion Derivatives of *Lactobacillus helveticus* CNRZ32", Science Direct, International Dairy Journal, vol. 17,pp. 976-984(2007).

Gummalla, S., et al., "Tryptophan Catabolism by Lactobacillus Casei and *Lactobacillus helveticus* Cheese Flavor Adjuncts", Journal of Dairy Science, vol. 82, pp. 2070-2077 (1999).

R. R. Ravula et al., XP000784444, "Effect of Acid Casein 1-36 Hydrolysate and Cysteine on the Viability of Yogurt and Probiotic Bacteria in Fermented Frozen Diary Desserts" Australian Journal of Dairy Technology, vol. 53, No. 3, pp. 175-179 91998).

I. M. Al-Ruqaie et al., XP0000980379, "Improvement in the Quality of the Dried Fermented Milk Product, OGGTT" Journal Dairy Research, vol. 54, No. 3, pp. 429-435 (1987).

International Search Report PCT/EP2007/009185 dated Feb. 13, 2008.

* cited by examiner

TASTE AND FLAVOR MODULATION BY BIOTRANSFORMATION IN MILK PRODUCTS

This application is a 371 filing of International Patent Application PCT/EP2007/009185 filed Oct. 23, 2007.

FIELD OF THE INVENTION

The present invention relates to a method for promoting natural tastes and flavours in milk-based products, to a method for manufacturing said milk products and to the products thus obtainable.

BACKGROUND OF THE INVENTION

Traditionally, in the production of milk products such as cheese, butter etc., the characterising flavours are developed during fermentation of the milk source with bacteria.

In recent years, novel flavouring agents which can be added to milk products for taste improvement have been developed. These flavouring agents are traditionally obtained by treating a milk source with enzymes, micro-organisms etc. For instance, a number of publications describe fermentation of a milk source with micro-organisms and enzymes such as lipases, proteases etc. to produce aromas which can be isolated and used in the manufacture of flavoured milk products such as cheese, milk, fermented milk etc. Amongst these publications are CA 1220075, EP 137536, JP 2003-250482, JP 3127962, JP 5049385, JP 2002-142713, JP 5091851, JP 58043755, JP 6125733, JP 64002549, EP 1053689, EP 1186244, U.S. Pat. No. 3,858, 492, JP 2004-267126, JP 6319448, U.S. Pat. No. 6,635,303 B1, JP 2005-151895, JP 3175978, JP 2004-236638, JP 4169166, JP 9037735, U.S. Pat. No. 3,975,544, and WO 0147366. The flavours thus obtained are described as "dairy" flavours and therefore act as flavour enhancers to dairy products.

However, there are limited reports on using a process similar to that described above in order to provide flavours distinct from "dairy" flavours such as, for example, chocolate, fruity flavours etc.

WO 02/00845 describes a way to obtain chocolate-flavoured fermented products by fermenting a milk source with a mixed micro-organism culture. This method is however of limited scope in terms of the flavours obtained and in terms of the applications.

In order to achieve a variety of different, distinct flavours, artificial synthetic flavourings are normally added to the milk products. The use of artificial flavourings is quite often linked with a negative impression by the consumers.

There is thus a need to provide a wide variety of flavours in a natural way which can be used in a wide range of foods, and which thus avoids the use of artificial flavourings.

SUMMARY

Accordingly, the present object is achieved by means of the features of the independent claims. The dependent claims develop further the central idea of the invention.

The present invention proposes in a first aspect a method to promote a non-savoury flavour in a food product, comprising the steps of:
a) adding at least one amino acid to a milk source or adding a protease and/or peptidase to the milk source in order to obtain at least one amino acid from a milk protein,
b) adding at least one micro-organism to the milk source, wherein the micro-organism is selected for producing at least one enzyme capable of converting the amino acid,
c) fermenting the milk source
d) adding a lipase and/or lactase prior to and/or during and/or after fermentation
e) optionally drying the fermented milk source and
f) adding said fermented milk source to the food product.

In a second aspect, the invention provides a method for flavouring milk powder comprising the steps of:
a) adding at least one amino acid to a milk source or adding a protease and/or peptidase to the milk source in order to obtain at least one amino acid from a milk protein,
b) adding at least one micro-organism to the milk source, wherein the micro-organism is selected for producing at least one enzyme capable of converting the amino acid,
c) fermenting the milk source
d) optionally drying the fermented milk source and
e) adding said fermented milk source to the milk powder or milk powder precursor.

A method for flavouring a frozen dessert comprising the steps of:
a. adding at least one amino acid to a milk source or adding a protease and/or peptidase to the milk source in order to obtain at least one amino acid from a milk protein,
b. adding at least one micro-organism to the milk source, wherein the micro-organism is selected for producing at least one enzyme capable of converting the amino acid,
c. fermenting the milk source
d. optionally drying the fermented milk source and
e. adding said fermented milk source to the frozen dessert mix also falls under an aspect of the present invention.

An alternative method for flavouring a food product comprising the steps of:
a) adding at least one amino acid to a milk source or adding a protease and/or peptidase to the milk source in order to obtain at least one amino acid from a milk protein
b) optionally adding L-rhamnose to the milk source
c) adding a lipase and/or lactase prior to and/or during and/or after enzymatic treatment
d) heat treatment the milk source
e) optionally drying the treated milk source and
f) adding said treated milk source to the food product
is also part of the present invention.

Further, a frozen or chilled dessert obtainable by a method disclosed herein and a milk powder obtainable by a method disclosed herein.

A liquid flavour concentrate obtainable by
a) adding at least one amino acid to a milk source or adding a protease and/or peptidase to the milk source in order to obtain at least one amino acid from a milk protein,
b) adding at least one micro-organism to the milk source, wherein the micro-organism is selected for producing at least one enzyme capable of converting the amino acid and
c) fermenting the milk source
falls under an aspect of the present invention.

A milk powder-like product comprising per kg of product 1-20000 mg, preferably 10-500 mg butanoic acid, 10-10000 mg, preferably 100-3000 mg hexanoic acid, 10-6000 mg, preferably 100-3000 mg octanoic acid, 2-13000 mg, preferably 50-1000 mg decanoic acid also forms part of the present invention.

The invention relates to the use of a milk powder-like product disclosed herein in the manufacture of ice cream, milk powder, chocolate-based product, dairy product, creamer, cocoa beverage, culinary product, infant formula or health care product.

Finally, a method for flavouring a food product comprising the steps of:
a) adding at least one amino acid to a milk source or adding a protease and/or peptidase to the milk source in order to obtain at least one amino acid from a milk protein
b) optionally adding L-rhamnose to the milk source
c) adding a lipase and/or lactase prior to and/or during and/or after enzymatic treatment
d) heat treatment the milk source
e) optionally drying the treated milk source and
f) adding said treated milk source to the food product
also forms part of the invention.

FIGURES

The present invention is further described hereinafter with reference to some of its embodiments shown in the accompanying drawings in which.

DETAILED DESCRIPTION OF THE INVENTION

Figure 1:
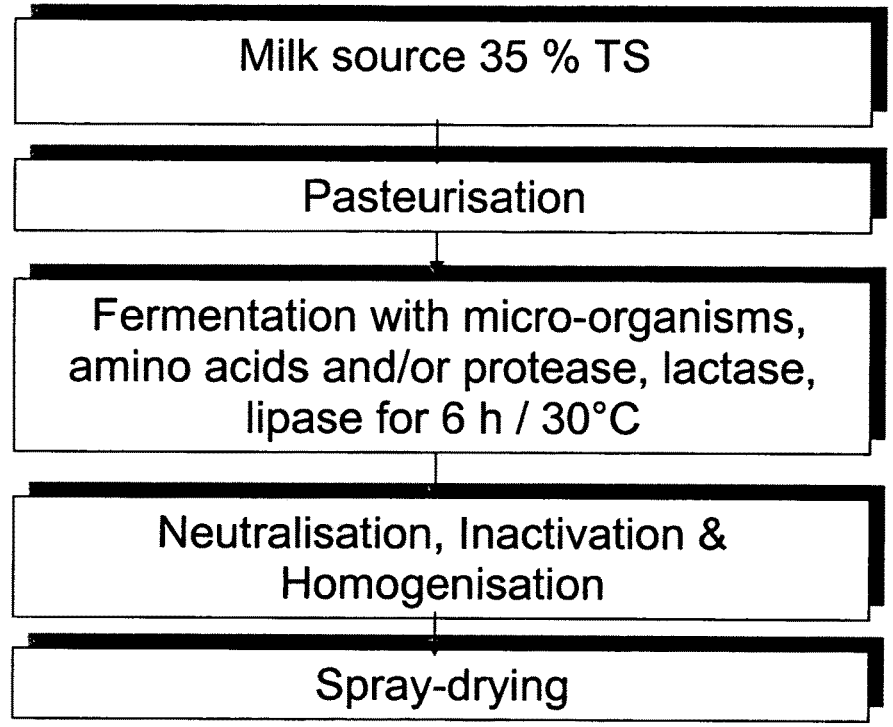
FIG. 1 is a flow-chart showing method steps in the production of a sweet honey or sweet honey and cream butter flavoured milk powder

The present invention is concerned with the production of natural flavours which can be used in a number of food applications.

Thus, the invention relates, in a first aspect, to a method to promote a non-savoury flavour in a food product. By "non-savoury" flavour is meant a flavour which is not savoury, i.e. not salty, spicy, sharp etc. A typical savoury flavour would be a cheesy, meaty, salty flavour. However, the invention does not relate to such flavours but to "non-savoury" flavours. The flavours of the present invention thus include "sweet", creamy etc. flavours. Additionally, the flavours of the invention preferably do not include yogurt flavours.

In a preferred embodiment, the flavour is selected from honey, caramel, cocoa, malt, cream-caramel, sweet-honey cream, cocoa-cream, coffee, cream, butter, vanilla, nutty, chocolate and any combination or sub-combination thereof.

Such method for promoting said non-savoury flavour in a food product involves, in a first step, the addition of at least one amino acid to a milk source. Alternatively, the addition of a protease and/or peptidase to a milk source in order to obtain at least one amino acid from a milk protein is possible.

In the present invention, the enzymes may be provided as such, in the form of enzyme preparations, in the form of immobilised enzymes and may even be provided by appropriate micro-organisms.

Any amino acid may be used. Preferably, the amino acid is selected from phenylalanine, leucine, isoleucine, valine and mixtures thereof.

The amino acid may be added to the milk source in an amount of 0.01 to 5 wt %, preferably 0.01-2 wt %, more preferably in an amount of 0.03-1.0 wt %, most preferably 0.05-0.3 wt % on dry matter.

In a preferred embodiment, a source of alpha-keto acid, such as alpha-ketoglutarate, alpha-ketoisocaproate, alpha-ketoisovalerate, similar amino acceptors or mixtures thereof may also be added to the milk source. Preferably, alpha-ketoglutarate is used. These naturally occurring compounds help contribute to the enzymatic pathway of the amino acid, as occurs in the subsequent steps of the present method.

Optionally, cofactors for improving fermentation efficiency such as manganese or magnesium salts may also be added to the milk source.

The milk source may be UHT-treated, pasteurised or non-pasteurised. It may be selected from milk (full fat, skimmed or semi-skimmed), fresh milk, recombined milk, cream, buttermilk, whey, milk containing vegetable fat etc. and any mixtures thereof. Any type of milk can be used, such as cow, sheep, goat or buffalo milk or any mixtures thereof.

If the milk source is non-pasteurised, the milk source and amino acid mixture may be pasteurised or ultra-high temperature treated or sterilised under typical conditions in the range of 70° C. to 150° C. over 2 s to 20 min, e.g. 125° C. for 20 s. Alternatively, the milk source may be heat-treated first prior to amino acid addition, or prior to treatment with a protease and/or peptidase.

Optionally, L-rhamnose may be added to the milk source.

To the milk source is then added, in a second step, at least one micro-organism, wherein the micro-organism is selected for producing at least one enzyme capable of modifying the amino acid.

In the present method, the micro-organism is selected in particular for its ability to produce an enzyme, the action of which, depending on the substrates, produces direct or indirect conversion products which are responsible for a particular flavour.

Such enzymes are typically transamidase, decarboxylase, dehydrogenase enzymes. Other enzymes such as aldolase may also be produced. Optionally, additives such as protease and/or peptidase may be added together with the micro-organisms.

The micro-organisms used in the present method may be selected from the group consisting of *Betacoccus, Lactobacillus, Propionibacteria, Streptococcus, Bifidobacterium, Penicillium, Brevibacterium, Arthrobacter, Corynebacterium, Saccharomyces, Debaromyces, Lactococcus* and any mixtures thereof and/or mixtures of different strains of the same micro-organism. Preferably, it is a *Lactococcus lactis* and more preferably it is a *Lactococcus lactis* including subspecies. Most preferably, it is a *Lactococcus lactis* subsp. *lactis* and/or *Lactococcus lactis* subsp. *lactis biovar. diacetylactis*. It may be added in the form of a living microbial starter culture or in the form of a microbial culture after cell lysis or a mixture of both.

Strains of *Lactococcus lactis* which are commercially available and which are suitable for use in the present invention are for example *Lactococcus lactis* ATCC 29146, *Lactococcus lactis* subsp. *lactis* DSM 4366, or still mesophilic aromatic culture (mix), type LD, F-DVS XT-313-eXact, Chr. Hansen.

Under fermentation conditions, the micro-organism produces at least some enzymes capable of converting the amino acid into further components. Said micro-organisms are capable of producing enzymes such as transamidase and/or decarboxylase and/or dehydrogenase enzymes, which will act on the amino acid(s) present in the fermentation broth. Aldolase may also be produced by the micro-organism.

Thus, in an alternative embodiment, the micro-organism may be replaced or supplemented with enzymes or enzyme mixes which act on the amino acid to produce the desired flavour character. Furthermore, cell lysates can also additionally be used to modify the amino acid.

Additional enzymes, such as lipase, lactase etc. may also be added to the fermentation broth at the start of the fermentation or at a later stage. These may be added in the form of enzyme preparations or micro-organisms which produce said enzymes. Thus, a lipase and/or lactase may be added prior to and/or during and/or after fermentation. This is advantageous for further modulation of the flavour obtained.

The mix is then fermented. Under fermentation conditions, the released enzymes will react with the amino acid(s) present in the fermentation mixture to provide direct or indirect conversion products which are responsible for particular aromas. These are, for instance, from the group of 3-methyl-butanal, 2-methyl-butanal, 2-methyl-1-propanal, 2-phenylacetaldehyde, 2,3-butandione(diacetyl), 3-hydroxy-2-butaneone(acetoin), 2-phenyl-2-butenal and other phenyl-aldehydes (C10-16), benzaldehyde, 5-methyl-2-phenyl-cis-2-hexenal(cocal), 2,3,5,6-tetramethyl pyrazine, 2,4,5-trimethyl oxazole, delta-octalactone(5-octanolide), delta-decalactone(5-decanolide), delta-dodecalactone(5-dodecanolide), butanoic acid, hexanoic acid, octanoic acid, decanoic acid, dodecanoic acid, 4-hydroxy-2,5-dimethyl-3(2H)-furanone(furaneol). By phenyl-aldehydes (C10-16) is meant phenyl-aldehydes having a carbon chain of 10 to 16 carbon atoms.

Figure 3:
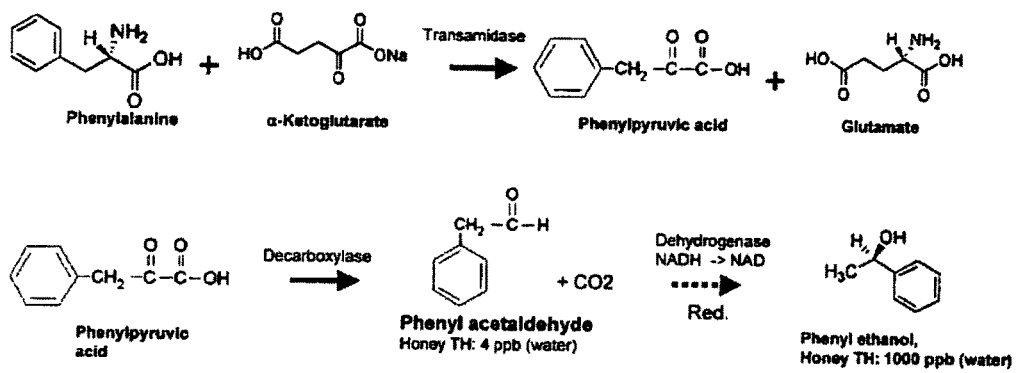
FIG. 3 depicts a series of chemical reactions which may lead to compounds responsible for the honey flavour.
Figure 4:
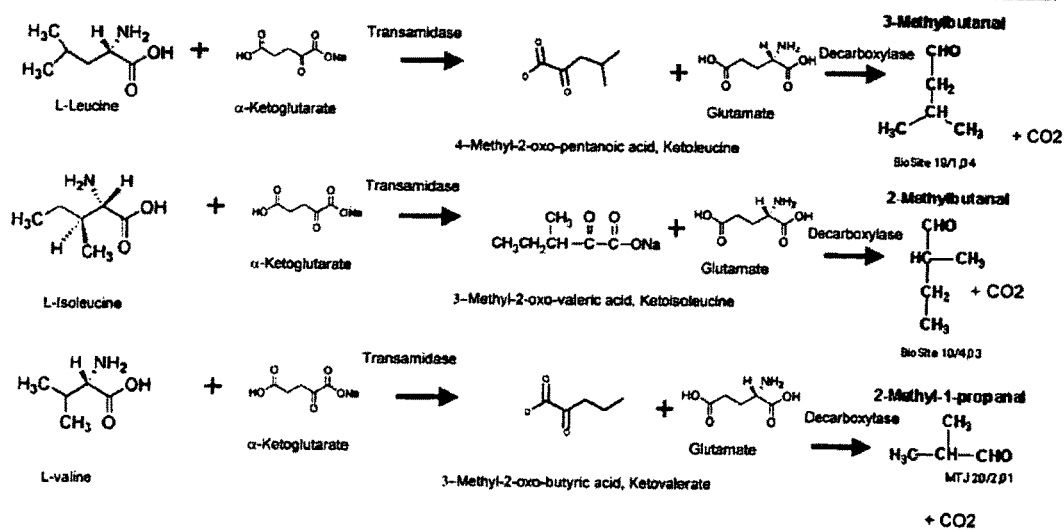
FIG. 4 depicts a series of chemical reactions which may lead to compounds responsible for a cocoa and malt flavour.
Figure 5:
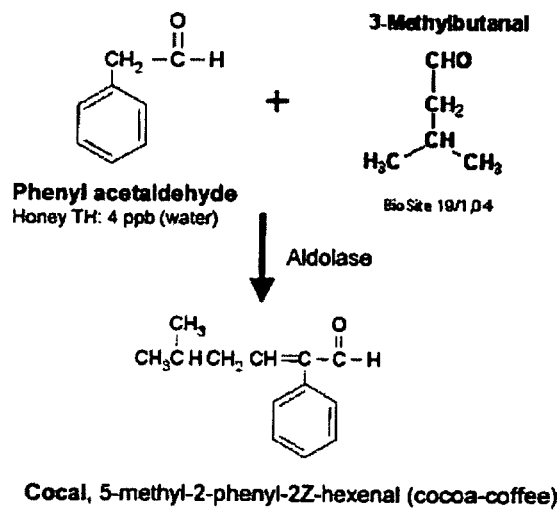
FIG. 5 depicts a chemical reaction which may lead to compounds responsible for a cocoa/coffee flavour.
Figure 6:
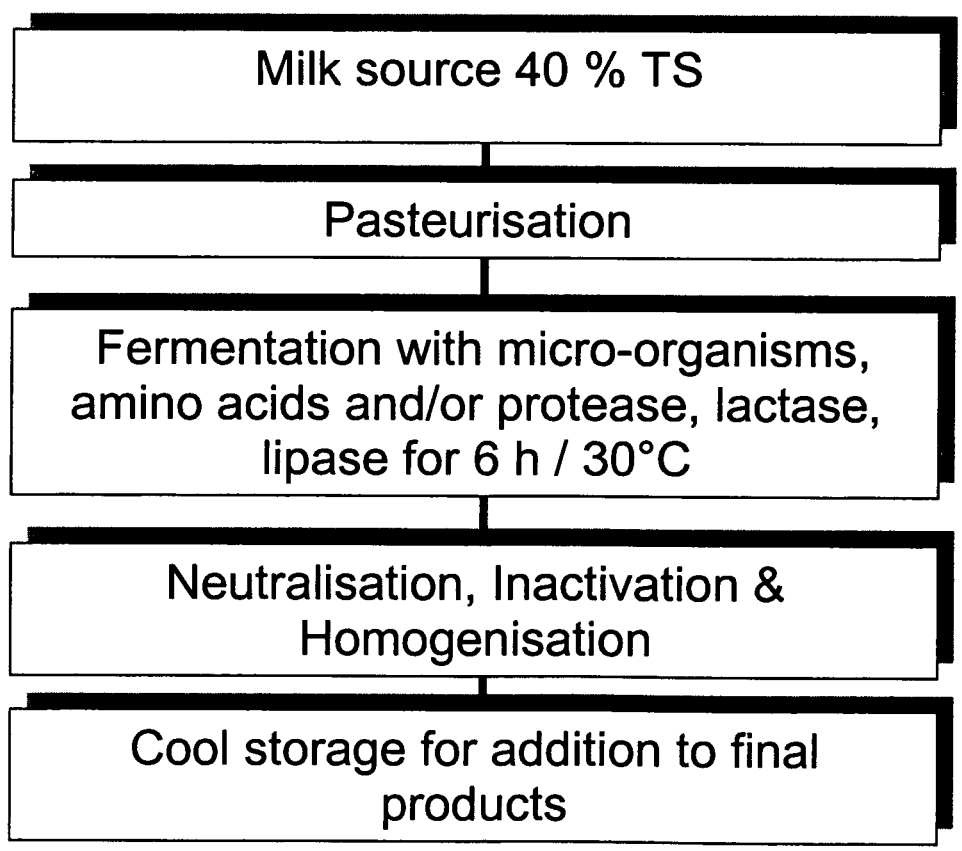
FIG. 6 is a flow-chart showing method steps in the production of a liquid flavouring product.

In this context, FIGS. 3, 4 and 5 depict reaction pathways which may lead to some compounds responsible for honey flavour, for cocoa and malt flavour, or for cocoa/coffee flavour respectively. It is clear to the skilled person that FIGS. 3 to 5 are not illustrative of the full process nor of all the reactions occurring when carrying out the methods of the invention. It is also clear that other reactions may occur during fermentation and that other compounds may be produced which provide further modulation of the flavours.

In order to modulate the flavour of the fermentation broth, the amino acid used may be chosen accordingly.

For instance, it has been found that when the amino acid selected is phenylalanine, the direct or indirect conversion products when subjected to a transamidase and/or decarboxylase and/or dehydrogenase enzyme are responsible for a honey-like flavour.

When the amino acid is selected from L-leucine, L-isoleucine, L-valine or mixtures thereof, the particular flavours obtained are those of malt and cocoa.

When rhamnose is optionally used in the starting milk basis, and the mixture before or after fermentation is heated for about 90 minutes at about 90° C., the resulting aroma is that of caramel.

Thus flavours such as honey, caramel, cocoa, malt, cream-caramel, sweet-honey cream, cocoa-cream, coffee, cream, butter, vanilla, nutty, chocolate etc. and any combination or sub-combination thereof may also be obtained by the method of the invention. Furthermore, the tastes obtained by the method of the invention may be creamy, mouth-coating, long-lasting tastes.

Typically, the fermentation is allowed to take place for about between 2 and 24 hours, preferably between 3 and 12 hours, more preferably about 6 hours at a temperature between 8 and 50° C. Preferably, the fermentation is carried out for about 6 hours at about 30° C.

After a period of time sufficient to produce the desired compounds, the fermentation broth may be cooled to produce a liquid flavour concentrate. A liquid flavour concentrate obtainable by the steps described above is part of the present invention. Alternatively, it may be dried, preferably spray-dried, in order to produce a milk powder-like product having a modulated flavour profile.

After fermentation, the fermentation broth may optionally be neutralised and/or inactivated and/or homogenised by methods known in the art.

Optionally, if the milk source contains L-rhamnose, it may be heated. This heating step differs from the pasteurisation step and the inactivation step in that it is typically carried out for about 90 minutes at about 90° C., in order to develop a caramel-like flavour in the mixture. Without wishing to be bound by theory, it is thought that the sugar sources in the milk basis (lactose, rhamnose etc.) undergo a number of reactions (Maillard reaction pathway) which are responsible for the caramel-like flavour. This heating step may be carried out before or after fermentation.

Optionally, the fermented mixture may be enzymatically treated with a lipase, lactase etc. This may be carried out in order to facilitate the drying step and/or to further modulate the taste and flavour of the final product.

For instance, further enzymatic treatment may provide a vanilla-like, cream-like flavour which imparts a creamy, mouth-coating, long-lasting taste to the final product.

Furthermore, the enzymatic treatment may further improve drying properties of the fermented mixture.

Alternatively also, the fermentation broth may be blended with further ingredients. This may be done prior to drying or prior to cool storage for liquid applications, in order to provide, upon drying or not, a finished product.

As another alternative, a milk source treated in a parallel stream may be added to the fermented broth.

The fermented mixture may then be cooled and the liquid product may be stored at low temperature for further use. Such temperatures are typically between 0 and 10° C. The fermented product may then be used as a liquid flavour concentrate in the manufacture of food products.

Alternatively, the fermented mixture is then dried, preferably by spray-drying, to give a milk powder-like product. By milk powder-like products is meant products which have the same appearance as and consistency of milk powder, are based on milk, but are produced in a different way. Thus, the present invention also concerns milk powder-like products.

According to the invention, a milk powder-like product comprising per kg of product 1-20000 mg, preferably 10-500 mg butanoic acid, 10-10000 mg, preferably 100-3000 mg hexanoic acid, 10-6000 mg, preferably 100-3000 mg octanoic acid, 2-13000 mg, preferably 50-1000 mg decanoic acid is provided.

In an embodiment, the milk powder-like product further comprises per kg of product 0.1-10 mg, preferably 0.1-3 mg, more preferably 0.3-1 mg of 3-methyl-butanal, 0.1-100 mg, preferably 0.1-5 mg, more preferably 0.5-2.5 mg of 2-phenylacetaldehyde, 0.1-1000 mg, preferably 0.1-10 mg, more preferably 1-5 mg of diacetyl, 0.5-1000 mg, preferably 0.5-20 mg, more preferably 1-10 mg of acetoin, 1-300 mg, preferably 1-100 mg, more preferably 10-70 mg of 2,3,5,6-tetramethyl pyrazine, 0.01-50 mg, preferably 0.01-20 mg, more preferably 0.01-15 mg of 2,4,5-trimethyl oxazole, 0.05-50 mg, preferably 0.05-10 mg, more preferably 0.1-8 mg of 2-phenyl-2-butenal and other phenyl aldehydes (C10-C16), 0.1-50 mg, preferably 0.1-10 mg, more preferably 0.5-8 mg of benzaldehyde. Preferably, the powder comprises 100-400 mg of butanoic acid, 500-2000 mg of hexanoic acid, 500-1500 mg of octanoic acid, 100-700 mg of decanoic acid per kg of product. Such milk powder-like product has a particular honey-cream flavour.

According to another embodiment, the milk powder-like product further comprises per kg of product 0.1-1000 mg, preferably 0.1-50 mg, more preferably 1-3 mg of diacetyl, 0.5-1000 mg, preferably 0.5-50 mg, more preferably 1-20 mg of acetoin, 1-300 mg, preferably 1-100 mg, more preferably 15-80 mg of 2,3,5,6-tetramethyl pyrazine, 0.01-50 mg, preferably 0.01-20 mg, more preferably 0.01-15 mg of 2,4,5-trimethyl oxazole, 0.1-10 mg, preferably 0.5-8 mg of benzaldehyde. Preferably, the powder comprises 50-300 mg of butanoic acid, 500-2000 mg of hexanoic acid, 400-2500 mg of octanoic acid and 100-700 mg of decanoic acid per kg of product. Such milk powder-like product has a particular cream-butter flavour.

According to another embodiment, the milk powder-like product further comprises per kg of product 0.1-100 mg, preferably 0.1-10 mg, more preferably 0.5-5 mg of 3-methyl-butanal, 0.05-100 mg, preferably 0.05-10 mg, more preferably 0.1-5 mg of 2-methyl-butanal, 0.05-20 mg, preferably 0.1-2 mg, more preferably 0.1-1 mg of 2-methyl-propanal, 0.1-500 mg, preferably 0.1-10 mg, more preferably 1-8 mg of diacetyl, 0.5-500 mg, preferably 0.5-20 mg, more preferably 1-10 mg acetoin, 1-500 mg, preferably 1.5-300 mg of 2,3,5,6-tetramethyl pyrazine, 0.01-20 mg, preferably 0.01-15 mg of 2,4,5-trimethyl oxazole, 0.05-10 mg, preferably 0.1-8.5 mg of 2-phenyl-2-butenal and other phenyl-aldehydes (C10-16), 0.1-10 mg, preferably 0.5-8.5 mg of benzaldehyde. Preferably, the powder comprises 50-350 mg of butanoic acid, 400-2000 mg of hexanoic acid, 400-2000 mg of octanoic acid and 100-800 mg of decanoic acid per kg of product. Such milk powder-like product has a particular cocoa-cream and malt-cream flavour.

According to another embodiment, the milk powder-like product further comprises per kg of product 0.1-20 mg, preferably 0.1-10 mg, more preferably 0.5-8 mg of 4-hydroxy-2,5-dimethyl-3(2H)-furanone. Preferably, the powder comprises 20-400 mg of butanoic acid, 300-2000 mg of hexanoic acid, 300-2000 mg of octanoic acid and 100-800 mg of decanoic acid per kg of product. Such milk powder-like product has a particular cream-caramel flavour.

The concentrations of flavour compounds can be determined by head space adsorption to solid phase microextraction fibres, separation by gas chromatography and detection and identification by mass spectrometry. For relative quantification, the response of flavour compounds are related to the known amounts of the internal standards ethylvalerate (neutral compounds) and 4-methyloctanoic acid (acidic compounds). It is therefore clear to the skilled person that these values are not absolute values and can slightly vary depending on the type of measurements used.

The milk powder-like products of the invention typically comprise 1-40 g, preferably 1-20 g diglycerides and 0.2-30 g, preferably 0.2-20 g monoglycerides per 100 g of product.

The milk powder-like products obtainable by the present method may be used as such, for example to provide flavoured milk drinks.

The fermented milk source may thus be in the form of a liquid concentrate or a powder.

These milk powder-like products or the liquid fermentation product may be used, according to the present invention, in the manufacture of food products.

Thus, in a final step, the fermented milk source, either as a liquid or a powder, is added to a food product. Typically, the fermented milk source is added to the food product in an amount of 0.05-10% by weight on a dry matter basis. The food product is preferably selected from ice cream, milk powder, chocolate-based product, dairy product, creamer, cocoa beverage, culinary product, infant formula or health care product.

In a preferred embodiment, the taste and flavour modulated milk powder-like products are added in relatively small amounts to food products, for example 0.05-10 wt % for liquid, solid or powder products.

In a particular embodiment of the present invention, the fermented milk source is added to a milk powder or a milk powder precursor. The fermented milk source may be in liquid concentrate or powder form. Thus, the fermented milk source may be added in the powder form to a milk powder and thus provide a flavoured milk powder. Depending on the amount added, the resulting product may have a strong flavour or a more subtle flavour.

In an even more preferred embodiment, the milk powder-like product produced by the present invention is added to a milk powder in an amount of about 0.05-10% by weight, most preferably 1-8% by weight of said milk powder.

Alternatively, the fermented milk source may be added to a milk powder precursor and further spray-dried to yield the flavoured milk powder. By "milk powder precursor" is to be understood a standard liquid milk composition prior to spray-drying.

The resulting products may thus be provided with a subtle, subliminal, distinct flavour perception.

In another embodiment of the present invention, the fermented milk source is added to a frozen dessert mix. The fermented milk source may again be in the form of a liquid concentrate or a powder. It may be added to the frozen dessert mix at any stage of manufacture of the frozen dessert. This results in a frozen dessert, preferably an ice cream, having a subtle natural flavour.

The present methods offer the advantage that it allows a lot of variation as to the components present in the fermented milk source which can further be used for addition in a wide variety of food products. It combines aspects of the food ripening methods known in the art, and adapts it to a new field, notably that of natural flavour powders or natural flavour liquid concentrate. The powders or liquid concentrates thus obtainable may be used in any food application, such as milk drinks, ice cream, chocolate, soups, dairy product, culinary product, infant formulae, health care products etc.

The method further allows to "tailor" the flavours obtained upon fermentation, such that a modulation in the taste of the milk powder-like product, the liquid concentrate or the final food product is possible.

Thus, the present invention provides many options for the variation and modulation of milk powder-like product, whereby variation can be obtained by any combination of amino acid and/or processing conditions as described above.

The variety of flavours obtainable by the method of the present invention lends itself thus to a wider range of applications.

Figure 2:
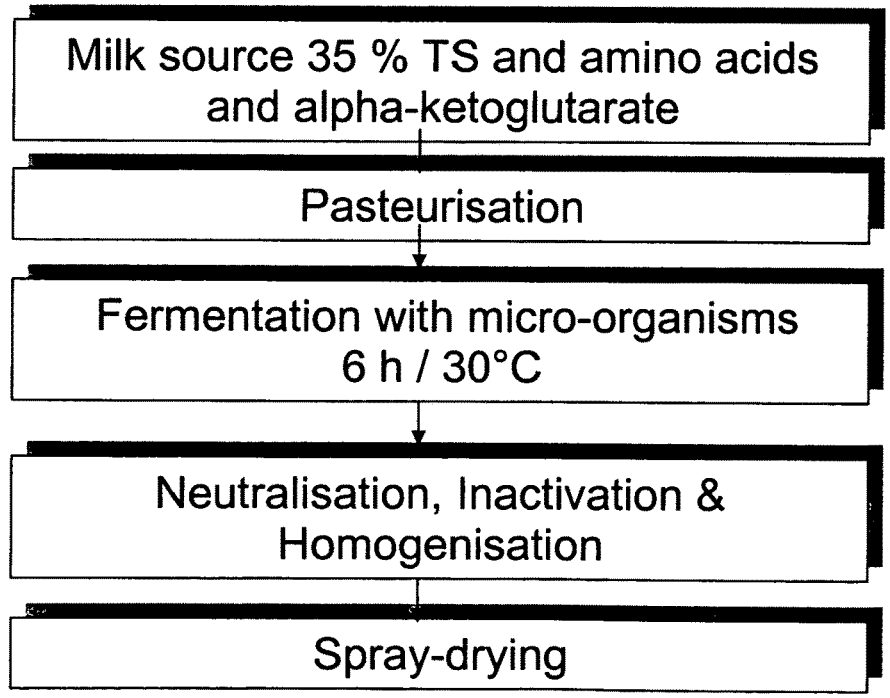
FIG. 2 is a flow-chart showing method steps in the production of a malt and chocolate or a malt, chocolate and honey flavoured milk powder

Referring to FIGS. 1, 2 and 5 which represent some embodiments of the methods of the present invention, it can be seen that various flavours, in such cases sweet honey, sweet honey and cream butter, malt and chocolate, and milk, chocolate and honey flavours may be obtained. The parameters which may be altered in each case may be the amino acids, the micro-organism(s) and/or the amount thereof, for instance more than one source, the order of processing etc.

The milk powders or other food products obtainable by methods of the present invention, present the advantage that they are free of additives and the resulting products are thus "clean label" products. This is in contrast to traditional milk-based powders which require the addition of artificial flavouring in order to modulate their aroma.

Furthermore, the flavours are derived from biological processes, e.g. enzymatic, microbial, and are therefore naturally generated flavour compounds, or "bioflavours".

It is also within the present invention to modify certain components, or mixtures of components when carrying out the processes of the invention in order to obtain perceptible organoleptic differences in the final powders or liquid concentrates. Any combination of taste and flavour modulated milk powder or liquid concentrates by blending or process combinations are included in this application.

For instance, using a mixture of the amino acids phenylalanine, leucine, isoleucine and valine, a chocolate, malt and honey flavour may be obtained. Also, it is conceivable that by adding a source of rhamnose and phenylalanine to the milk source, and heating the mixture before or after fermentation prior to drying would yield a honey-caramel flavour.

Optionally, flavour compounds can be principally added as complementing additives to the fermented milk source.

However, this is not necessary since the present invention provides a wide range of flavourings which are completely natural.

According to a further embodiment of the present invention a method for flavouring a food product is also provided, which method is similar to that described above, except that it does not require a fermentation step.

Thus, in an alternative embodiment, the present method comprises the first step of adding at least one amino acid to a milk source or adding a protease and/or peptidase to the milk source in order to obtain at least one amino acid from a milk protein. This step and all embodiments are the same as described above. Optionally, L-rhamnose may be added to the milk source.

To the milk source is then added, in a second step, a lipase and/or lactase. These enzymes may be as described above.

The milk source is then heat treated. After heat treatment, the milk source may optionally be dried. These are standard procedures known to a skilled person.

Finally, the dried milk source or the liquid milk source may be added to the food product in order to flavour it. The range of food products, the quantities, are as described above.

Thus, optionally, the fermentation step as described above may be omitted and flavour formation may be focused on enzymatic and heat treatment steps.

Thus, endless variations are possible and are within the grasp of a skilled person.

The present invention is further illustrated hereinafter by means of non-limiting examples.

EXAMPLES

Example 1

Sweet Honey-Cream Flavoured Milk Powder-Like Product 100 kg full cream milk powder is recombined with water to a final concentration of 35% dry matter. 0.1 kg of L-phenylalanine is added, the pH value adjusted to 6.7 with potassium hydroxide solution and the mix preheated at 80° C. and UHT treated at 125° C. for 20 s. After cooling to 30° C., 3 kg of *Lactococcus lactis* starter and 0.07 kg commercial lipase enzyme preparation is added to start the fermentation. After 10 hours at 30° C., the pH is adjusted to 6.7 with potassium hydroxide solution and 0.9 kg commercial lactase enzyme preparation is added and incubated for 3 hours. After cooling to 15° C. for intermediate storage, the mixture is heat treated at 80° C. for 80 s, homogenized and spray dried.

Example 2

Cocoa-Cream Flavoured Milk Powder-Like Product 100 kg full cream milk powder is recombined with water to a final concentration of 35% dry matter. 0.1 kg of L-phenylalanine, 0.1 kg alpha-ketoglutaric acid, 0.1 kg L-leucine, 0.1 kg L-isoleucine, 0.1 kg L-valine is added, the pH value adjusted to 6.7 with potassium hydroxide solution and the mix preheated at 80° C. and UHT treated at 125° C. for 20 s. After cooling to 30° C., 3 kg of a mixture of strains of *Lactococcus lactis* starter and 0.03 kg commercial lipase enzyme preparation is added to start the fermentation. After 12 hours at 30° C., the pH is adjusted to 6.7 with potassium hydroxide solution. After cooling to 15° C. for intermediate storage, the mixture is heat treated at 80° C. for 80 s, homogenized and spray dried.

Example 3

Analysis of Flavour Compounds 1.80 g NaCl is weighted into a 20 ml crimp top vial and a magnetic stirring bar is added. 5.50 g of sample solution containing 12% dry matter is added. 50 µl of internal standard ethylvalerate solution (45 µl ethylvalerate in 100 ml water) and 50 µl of internal standard 4-methyloctanoic acid solution (75 µl of methyloctanoic acid in 250 ml water) is added, followed by closing of the vial. The vial is then placed into a water bath at 65° C. using a magnetic hot plate stirrer with contact thermometer at a speed range of about 870 rpm. After an equilibration time of 30 min the fibre assembly (SPME Fibre Assambly, 2 cm, 50/30 µm DVB/CAR/PDMS StableFlex mounted in holder, both manufactured by SUPELCO Bellefonte, USA) is inserted by piercing the septa (depth gauge at 20 mm) and by exposure the fibre completely to the headspace above the sample solution. After a sorption time of 30 min the fibre is retracted and removed into the fibre assembly and out of the vial.

The fibre assembly is immediate injected into the GC injector (depth gauge at 30 mm) and the separation is started by exposure of the fibre at the same time. After 5 min the fibre is retracted and removed from the injector.

The flavour compounds are separated by gas chromatography on a FFAP capillary column (50 m, 0.2 mm inner diameter, 0.3 μm coating, Agilent Technologies USA) using helium as carrier gas and a temperature gradient from 40° C. to 250° C.

The separated compounds are detected and identified by mass spectrometry. Relative quantification is done by calculation of the response of flavour compounds in relation to the known amounts of the internal standards ethylvalerate (neutral compounds) and 4-methyloctanoic acid (acidic compounds).

Example 4

To 98 kg of ice cream mix, 3 kg of liquid fermented mix or 1 kg of fermented milk powder is added. The final ice cream mix is then pasteurized at 80° C. for 80 s, followed by homogenisation, cooling to 3° C., ice cream aging, freezing and packaging.

The invention claimed is:

1. A method to promote a non-savory flavor in a food product, the method comprising:
providing an amino acid in a milk source either by adding at least one amino acid to the milk source or by adding a protease or peptidase to the milk source in order to obtain the amino acid from a milk protein;
adding a micro-organism to the milk source, wherein the micro-organism comprises *Lactococcus lactis* and is selected for producing at least one enzyme capable of converting the amino acid;
fermenting the milk source, amino acid and micro-organism, for 3 to 12 hours at a temperature of 8 to 50° C., wherein the at least one enzyme reacts with the amino acid to form a conversion product which provides a non-savory flavor;
adding a lipase prior to the fermenting, and adding a lactase after the fermenting to form a fermented milk source, wherein the lipase and the lactase are added in the form of enzyme preparations or in the form of immobilized enzymes in an amount effective to further modulate taste or flavor of the final fermented milk source;
drying the fermented milk source; and
adding the fermented milk source to a food product in an amount sufficient to promote a non-savory flavor therein, wherein the fermented milk source is added in an amount effective to enable the conversion product to impart the non-savory flavor without generating any yoghurt or savory flavors in the food product.

2. The method of claim 1, wherein the food product is a milk powder, and the fermented milk source is added to the milk powder to prepare a flavored milk powder.

3. The method of claim 1, wherein the food product is a milk powder, and the method further comprises adding the fermented milk source to a milk powder precursor or liquid milk composition followed by spray-drying to prepare a flavored milk powder.

4. The method of claim 1, wherein the food product is a frozen dessert mix or ice cream, and the fermented milk source is added to the dessert mix or ice cream prior to, during or after freezing to prepare a flavored frozen dessert mix or flavored ice cream.

5. The method of claim 1, wherein the amino acid is selected from the group consisting of phenylalanine, leucine, isoleucine, valine and mixtures thereof, and between 0.01 to 5 wt % of the amino acid is present in the milk source.

6. The method of claim 1, wherein the milk source is selected from the group consisting of full fat milk, skimmed milk, semi-skimmed milk, fresh milk, recombined milk, cream, buttermilk, whey, milk containing vegetable fat and any mixtures thereof, and the method further comprises adding to the milk source an alpha-keto acid selected from the group consisting of alpha-ketoglutarate, alphaketoisocaproate, alpha-ketoisovalerate, and mixtures thereof.

7. The method of claim 1, which further comprises pasteurizing the milk source prior to the addition of the micro-organism, and wherein the microorganism is selected to produce one or more of transamidase, decarboxylase, dehydrogenase or aldolase.

8. The method of claim 1, wherein the micro-organism comprises at least one additional micro-organism selected from the group consisting of *Betacoccus, Lactobacillus, Propionibacteria, Streptococcus, Bifidobacterium, Penicillium, Brevibacterium, Arthrobacter, Corynebacterium, Saccharomyces, Debaromyces*, and any mixture thereof or mixtures of different strains of the same micro-organism.

9. The method of claim 1 comprising neutralizing, inactivating or homogenizing the fermented milk source prior to drying or addition of the fermented milk source to the food product.

10. The method of claim 1, which further comprises heating the milk source before or after the fermenting or drying of the fermented product.

11. The method of claim 1, which further comprises flavoring the fermented product with honey, caramel, cocoa, malt, cream-caramel, sweet-honey cream, cocoa-cream, coffee, cream, butter, vanilla, nutty, chocolate, or any combination or subcombination thereof.

12. The method of claim 1, which further comprises providing the fermented milk source in the form of a liquid concentrate or a powder and adding the liquid concentrate or the powder to the food product in an amount of 0.05 to 10% by weight on a dry matter basis, wherein the food product is selected from the group consisting of ice cream, chocolate-based product, dairy product, creamer, cocoa beverage, culinary product, infant formula, and health care product.

13. The method of claim 1, wherein the fermented product is dried to obtain a milk powder comprising 1 to 20 g diglycerides and 0.2 to 30 g monoglycerides per 1.00 g of powder before adding the milk powder to the food product.

14. The method of claim 13, wherein the milk powder further comprises, per kg of powder, 1 to 20000 mg butanoic acid, 10 to 10000 mg hexanoic acid, 10 to 6000 mg octanoic acid, and 2 to 13000 mg decanoic acid.

15. The method of claim 14, wherein the milk powder further comprises, per kg of powder, 0.1 to 10 mg of 3-methyl-butanal, 0.1 to 100 mg of 2-phenylacetaldehyde, 0.1 to 1000 mg of diacetyl, 0.5 to 1000 mg of acetoin, 1 to 300 mg of 2,3,5,6-tetramethyl pyrazine, 0.01 to 50 mg of 2,4,5-trimethyl oxazole, 0.05 to 50 mg of 2-phenyl-2-butenal or other C10-C16 phenyl aldehydes, and 0.1 to 50 mg of benzaldehyde.

16. The method of claim 14, wherein the milk powder further comprises, per kg of powder, 0.1 to 1000 mg of diacetyl, 0.5 to 1000 mg of acetoin, 1 to 300 mg of 2,3,5,6-tetramethyl pyrazine, 0.01 to 50 mg 2,4,5-trimethyl oxazole, and 0.1 to 10 mg of benzaldehyde.

17. The method of claim 14, wherein the milk powder further comprises, per kg of powder, 0.1 to 100 mg of 3-methyl-butanal, 0.05 to 100 mg of 2-methyl-butanal, 0.05 to 20 mg of 2-methyl-propanal, 0.1 to 500 mg diacetyl, 0.5 to 500 mg of acetoin, 1 to 500 mg of 2,3,5,6-tetramethyl pyrazine, 0.01 to 20 mg of 2,4,5-trimethyl oxazole, 0.05 to 10 mg of 2-phenyl-2-butenal or other C10-16 phenyl-aldehydes, and 0.1 to 10 mg of benzaldehyde.

18. The method of claim 14, wherein the milk powder further comprises, per kg of powder, 0.1 to 20 mg of 4-hydroxy-2,5-dimethyl-3(2H)-furanone.

19. The method of claim 13 which further comprises incorporating the milk powder into the food product which is selected from the group consisting of ice cream, chocolate-based product, dairy product, creamer, cocoa beverage, culinary product, infant formula, and health care product.

20. The method of claim 1, comprising adding L-rhamnose to the milk source.

21. The method of claim 1, wherein the micro-organism comprises *Lactococcus lactis* subsp. *lactis* biovar. *diacetylactis*.

22. A method to promote a non-savory flavor in a food product, the method comprising:
- providing an amino acid in a milk source either by adding at least one amino acid to the milk source or by adding a protease or peptidase to the milk source in order to obtain the amino acid from a milk protein, with the amino acid present in the milk source in an amount of 0.01 to 5 wt %;
- adding a micro-organism to the milk source, wherein the micro-organism comprises *Lactococcus lactis* and is selected for producing at least one enzyme capable of converting the amino acid;
- fermenting the milk source, amino acid and micro-organism, for 3 to 12 hours at a temperature of 8 to 50° C., wherein the at least one enzyme reacts with the amino acid to form a direct or indirect conversion product which provides a non-savory flavor, with the conversion product including one or more of 3-methylbutanal, 2-methyl-butanal, 2-methyl-1-propanal, 2-phenylacetaldehyde, 2,3-butandione (diacetyl), 3-hydroxy-2-butaneone (acetoin), 2-phenyl-2-butenal and other phenylaldehydes having a C10-C16 carbon chain, benzaldehyde, 5-methyl-2-phenyl-cis-2-hexenal (cocal), 2,3,5,6-tetramethyl pyrazine, 2,4,5-trimethyl oxazole, delta-octalactone (5-octanolide), deltadecalactone (5-decanolide), delta-dodecalactone (5-dodecanolide), butanoic acid, hexanoic acid, octanoic acid, decanoic acid, dodecanoic acid, or 4-hydroxy-2,5-dimethyl-3 (2H)-furanone (furaneol);
- adding a lipase prior to the fermenting, and adding a lactase after the fermenting to form a fermented milk source, wherein the lipase and the lactase are added in the form of enzyme preparations or in the form of immobilized enzymes in an amount effective to further modulate taste or flavor of the final fermented milk source;
- drying the fermented milk source; and
- adding the fermented milk source to a food product in an amount sufficient to promote a non-savory flavor therein, wherein the fermented milk source is added in an amount effective to enable the conversion product to impart the non-savory flavor without generating any yoghurt or savory flavors in the food product, and wherein the non-savory flavor comprises honey, caramel, cocoa, malt, cream-caramel, sweet-honey cream, cocoa-cream, coffee, cream, butter, vanilla, nutty, chocolate, or a combination thereof.

* * * * *